United States Patent [19]
DeJule et al.

[11] Patent Number: 5,617,109
[45] Date of Patent: Apr. 1, 1997

[54] THREE TERMINAL LIQUID CRYSTAL LENS CELL

[75] Inventors: Michael C. DeJule; Nabeel A. Riza, both of Clifton Park, N.Y.

[73] Assignee: General Electric Company, Schenectady, N.Y.

[21] Appl. No.: 348,404

[22] Filed: Dec. 2, 1994

[51] Int. Cl.⁶ ............................................. G09G 3/36
[52] U.S. Cl. ...................... 345/87; 345/103; 345/100; 345/208
[58] Field of Search ............................ 345/87, 100, 103, 345/208

[56] References Cited

U.S. PATENT DOCUMENTS

| | | | |
|---|---|---|---|
| 3,751,137 | 8/1973 | Fitzgibbons | 345/87 |
| 4,048,628 | 9/1977 | Boswell | 345/87 |

OTHER PUBLICATIONS

A page from Rodenstock RM 600 Laser Stylus catalog.
N.A. Riza et al., "Novel Programmable Nematic Liquid Crystal Lens Devices," Dectector Technologies Lab, May 1994.
N.A. Riza etal., "Three–Termnal Adaptive Nematic Liquid––Crystal Lens Device," Optical Society of America, 1994, pp. 1013–1015.
T.Tatebayashi et al., "Electro–Optic Variable Focal–Length Lens Using PLZT Ceramic," Applied Optics, vol. 30, No. 34, Dec. 1, 1991, pp. 5049–5055.

*Primary Examiner*—Richard Hjerpe
*Assistant Examiner*—Vui T. Tran
*Attorney, Agent, or Firm*—Donald S. Ingraham

[57] ABSTRACT

A three-terminal liquid crystal (LC) lens cell includes a center-biased symmetrical quadratic electrode network that has a center electrode electrically coupled to a bias voltage source, and a first and a second network electrode circuit. The respective bias voltage terminus of each network electrode circuit is coupled to the bias voltage source, and the respective control voltage terminus of each network electrode circuit is electrically coupled to a selectively variable lens focus control power supply. Each network electrode circuit further includes respective pluralities of network electrodes electrically coupled together in series and quadratic gradient network biasing resistors respectively electrically coupled therebetween to provide a symmetric quadratic voltage pattern. Each LC cell further is typically thin-film resistor biased, having an optically transparent electrically resistive planar layer disposed in electrical contact with each electrode in the center-biased symmetrical quadratic electrode network.

17 Claims, 4 Drawing Sheets

THREE TERMINAL LIQUID CRYSTAL LENS CELL

RELATED APPLICATIONS AND PATENTS

This application is related to the application entitled "Programmable Liquid Crystal Optical Wavefront Device", Ser. No. 08/348,403, filed contemporaneously herewith and incorporated herein by reference.

BACKGROUND OF THE INVENTION

Electro-optic devices such as liquid crystal cells are used in optical signal processing to control the passage of light beams through the processor. Optical signal processing is used in laser communication systems, optical recording and reading systems, and optical computing and associated interconnection architectures. One element commonly used in optical processing systems is a lens for focusing light beams on a particular point or in a desired pattern.

Liquid crystal (LC) cells used in optical processors typically control the passage of a light beam used in the signal processing. Although electro-optic devices such as LC cells typically have many desirable characteristics, such as rapid response, to date electro-optic liquid crystal lenses have proved to be rather cumbersome, requiring a large number of LC pixels (e.g., 100 or more independently controlled pixels in a device having a pixel pitch of about 100 μm) with an associated grid of control electronics. Each independently controlled pixel requires an associated driver to generate signals to control the pixel in coordination with other pixels to provide the desired lens focusing effect. In addition to the complexity of the control electronics, such devices often exhibit substantial attenuation of the light passing through the lens as a result of the non-ideal focusing resulting from the non-quadratic index variation caused by the electric fields in the EO device resulting from the respective discrete voltages applied to respective electrodes.

It is an object of this invention to provide a high quality electro-optic lens (e.g., with a diffraction limited spot) that is compact, robust, readily fabricated, does not require extensive control electronics, and that efficiently focuses the light passing therethrough.

SUMMARY OF THE INVENTION

In accordance with this invention a three-terminal liquid crystal (LC) lens cell includes a center-biased symmetrical quadratic electrode network having a center electrode electrically coupled to a bias voltage terminal, and a first and a second network electrode circuit, each of the network electrode circuits having a bias voltage terminus and a control voltage terminus. The respective bias voltage terminus of each network electrode circuit is coupled to the bias voltage terminal (so as to be at the same potential as the center electrode), and the respective control voltage terminus of each network electrode circuit is electrically coupled to a lens focus control terminal. Each network electrode circuit further includes respective pluralities of network biasing electrodes electrically coupled together in series and respective stages of quadratic gradient network biasing resistors, respective stages of the biasing resistors being electrically coupled in series between sequentially-coupled pairs of biasing electrodes to provide a symmetric quadratic voltage pattern across the LC cell. The symmetric quadratic voltage pattern refers to an electric field that varies in accordance with a quadratic relationship from either side of the center electrode.

Each LC cell further is typically thin-film resistor biased, having an optically transparent electrically resistive planar layer disposed in electrical contact with the center-biased symmetrical quadratic electrode network. The resistive planar layer has a substantially uniform resistivity so that a substantially linear voltage gradient exists across gaps between respective electrodes in the center-biased symmetrical quadratic electrode network. The resistive planar layer typically comprises a high resistance thin film material, such as a layer of n+ type (or alternatively, n− type) amorphous silicon.

Spherical and elliptical LC lenses typically include two LC cells optically coupled together in a cascade, with the respective focal lines of the LC cells disposed orthogonal to one another. In an alternative embodiment, such lenses may comprise a single cell having two center-biased quadratic electrode networks, one network disposed on each plate forming the cell (the respective focal lines of these networks being disposed orthogonal to the other).

An LC cell having a single focal line (that is, a cylindrical lens) has three terminals—the bias voltage terminal (coupled to the center electrode), the control voltage terminal coupled to each of the first and second network electrode circuits, and the ground terminal coupled to a ground electrode that is disposed on the opposite cover (or plate) of the LC cell, with the liquid crystal material disposed therebetween. In a cell having two respective center-biased symmetric quadratic biasing electrode networks disposed on opposite plates of the cell, the three terminals include the bias voltage terminal (coupled respectively to the center electrode on both cell plates) and respective lens focus control terminals for each network. The control voltage applied to the LC cell controls the symmetrical quadratic voltage gradient across the LC cell and thus the distance of the focal line from the cell.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
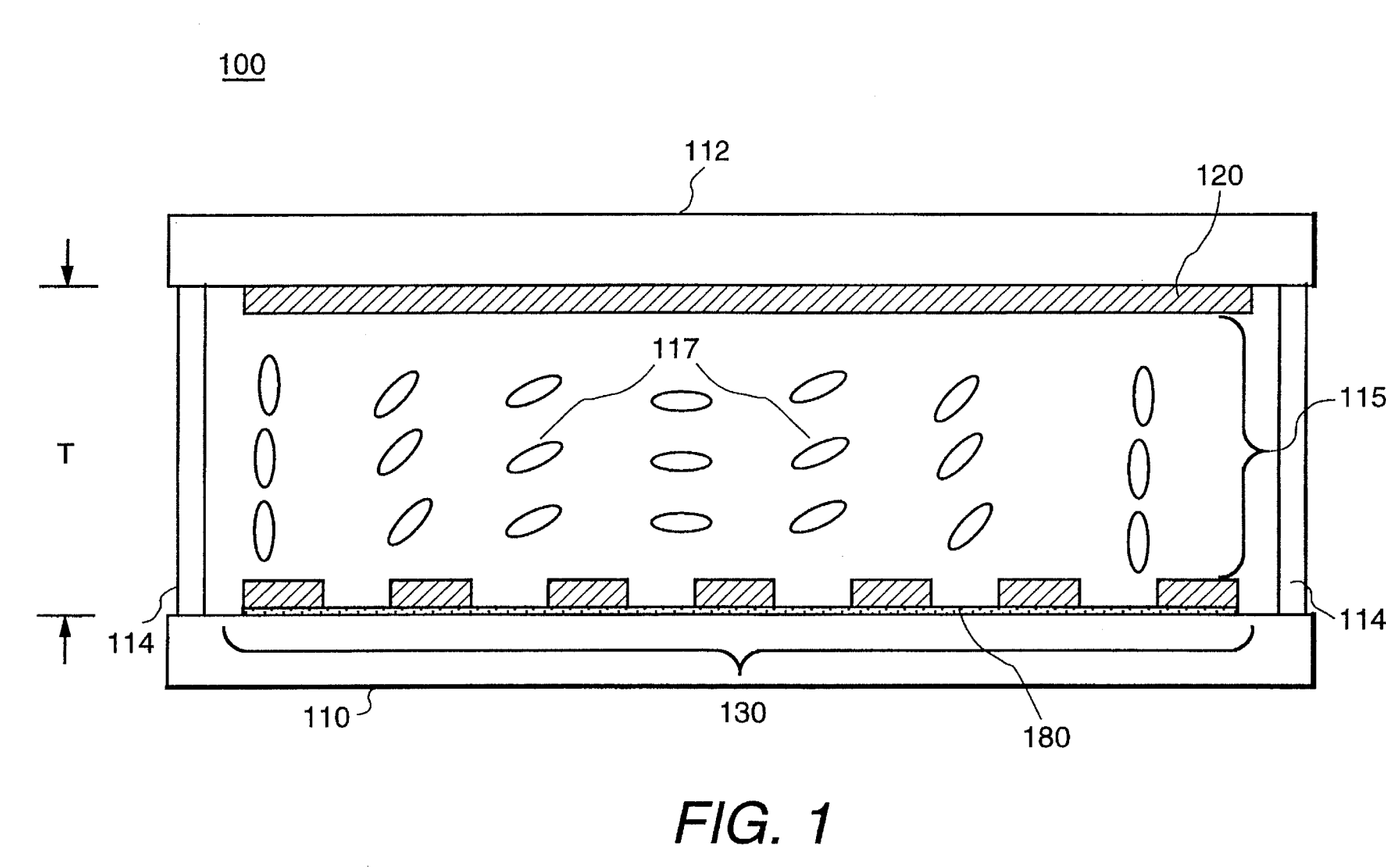
FIG. 1 is a cross sectional view of a liquid crystal cell in accordance with the present invention.

A three terminal liquid crystal cell 100 comprises a first cover 110, and a second cover 112 that is coupled to first cover 110 via sidewalls 114 so as to form a chamber 115 (or envelope) in which liquid crystal (LC) material 117 is disposed (FIG. 1). In accordance with this invention, LC cell 100 further comprises a center-biased quadratic electrode network 130 disposed on first cover 110 and a ground electrode 120 disposed on second cover 112 so as to generate (when a potential is applied to electrode network 130) an electric field across chamber 115 so as to control the orientation of molecules of liquid crystal material 117 (representative molecules being illustrated with the oblong shapes in chamber 115). LC cell 100 typically further comprises a resistive planar layer 180 on first cover 110 in electrical contact with center-biased quadratic electrode network 130.

First and second covers 110, 112 comprise glass such as Corning 7059 or the like. Liquid crystal material 117 typically comprises a nematic liquid crystal having a positive optical anisotropy, that is, having a birefringence ($\Delta n$) that has a value of about 0.2 or more. As used herein, $\Delta n$ or the positive optical anisotropy refers to the difference between the extraordinary index of refraction ($n_e$) of the LC material and the ordinary index of refraction ($n_o$) of the LC material (that is, $\Delta n = n_e - n_o > 0$). The larger the ($\Delta n$)T of an LC cell, the greater will be its capacity to bend light rays. Use of NLC material with a relatively large (e.g., >0.2) $\Delta n$ is desirable because the thickness "T" of LC cell 100 is relatively small (or thin), that is less than about 20 μm, and typically in the range between about 2 μm and 20 μm. It is necessary in design to compromise between cell thickness and cell response time (the rapidity with which a liquid crystals in the cell respond to an applied electric signal) as the response time of the cell is proportional to the square of the cell thickness. By way of example and not limitation, nematic liquid crystal (NLC) material such as E63 NLC material available from Merck Company has a $\Delta n$ of 0.227 at 589 nm). Alternatively, cell 100 may comprise other liquid crystal materials that show gray scale control behavior, such as twisted NLC and smectic 'A' liquid crystal.

Ground electrode 120 is disposed on the surface of second cover 112 facing chamber 115. Ground electrode 120 comprises a transparent conductive material such as indium tin oxide or the like, and is typically deposited on second cover 112 in evaporative process (a sputter process can also be used) to a thickness of several hundred angstroms. The portion of LC cell 100 containing liquid crystal material 117 comprises an active lens area 125 (illustrated in FIG. 2) of the cell (that is, light passing through this area of the cell is influenced by the position of the LC molecules in chamber 115). Ground electrode 120 is disposed across second plate 112 such that it has an area at least the same as that of active area 125. Ground electrode 120 is electrically coupled to a ground terminal 127 (FIG. 2) that provides a contact point for an external electrical connector to LC cell 100.

Center-biased symmetrical quadratic electrode network 130 comprises a center electrode 140, a first network electrode circuit 150, and a second network electrode circuit 160. As used herein, "center-biased" refers to an electrode network in which center electrode 140 is biased at a potential near the LC threshold value (that is, the minimum potential that results in deflection of the LC molecules from their non-biased orientation); for example, a typical center bias voltage potential is about 1 Volt (e.g., the peak voltage for a 1 KHz square wave) for the NLC material discussed above. Further, as used herein "symmetrical quadratic" or the like refers to an electric field that varies in accordance with a quadratic relationship from either side of center-biased electrode 140 (e.g., laterally along the plane of first cover 110); as the field is symmetrical, the magnitude of the electric field at the same distance on either side of center electrode 140 is the same (as illustrated in FIG. 2, the electric field is the same under first network electrode circuit 150 and second network electrode circuit 160).

Center electrode 140 comprises an electrically conductive material having a low resistance (e.g., less than 10 ohms per square, and desirably less than 1 ohm per square); for example, molybdenum, titanium, or chrome can be used to form center electrode 140. Alternatively, a transparent conducting material, such as indium tin oxide (ITO), can be used. Such transparent conducting material is typically not as conductive (having a resistance in the range of hundreds of ohms per square) as metals such as those mentioned above, but provides an advantage in that the electrode body does not block light passing through LC cell 100 (as do the more highly conductive metals mentioned above). The position of center electrode (in the symmetrical quadratic bias electrode network) on LC cell 100 determines the optical axis of LC cell 100, that is, the line along which the focal points of the cell (the focal line) will fall. Thus the focal line of the cell is corresponds to the axis of the center electrode. Center electrode 140 is electrically coupled to a bias voltage source 142 via a LC cell bias voltage terminal 144.

First and second network electrode circuits 150, 160 are in essence mirror images of the other. For purposes of illustration and not limitation, first network electrode circuit 150 is described below; second network electrode circuit 160 comprises corresponding components arranged in a similar fashion. First network electrode circuit comprises a plurality of LC biasing electrodes $152_1$–$152_n$. For ease of illustration, five representative electrodes ($152_1$ through $152_5$) are illustrated in FIG. 2; the actual number of electrodes in a network electrode circuit is a function of how accurately a designer wants to approximate a continuous quadratic function. For example, 98 electrodes disposed on a 1 mm by 1 mm active area has been shown to provides a very good approximation of a cylindrical lens. Additionally, the arrangement of the electrode network is selected to provided the desired lens aperture and focal depth.

Figure 2:
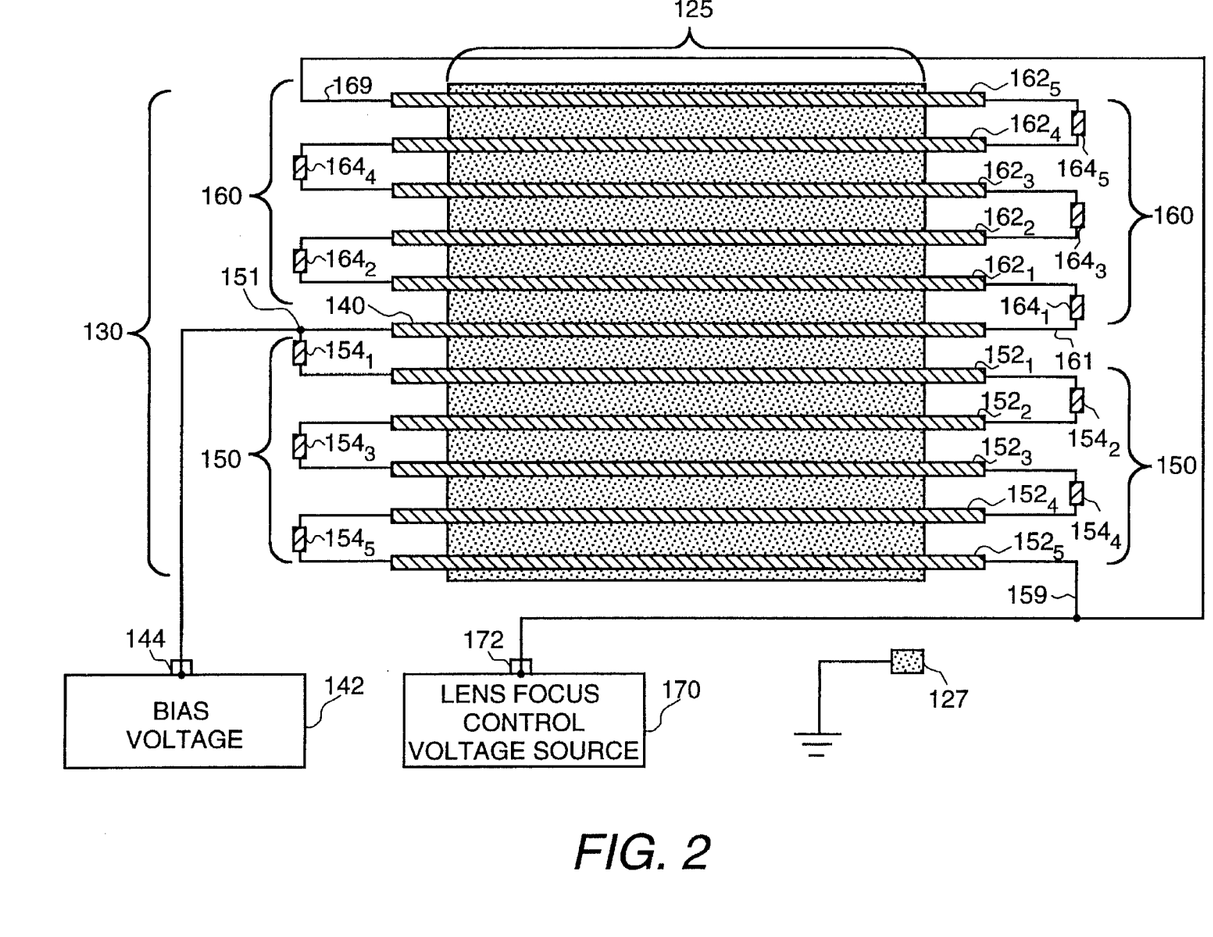
FIG. 2 is a plan view of a portion of a liquid crystal cell in accordance with the present invention.

First network electrode circuit 150 further comprises a plurality of thin film quadratic gradient network biasing resistors $154_1$–$154_n$ (representative resistor stages $154_1$–$154_5$ being illustrated in FIG. 2). Each biasing resistor stage may comprise one or more resistors electrically coupled together to provide the desired resistance for that stage in the respective network electrode circuit to provide the desired quadratic voltage gradient across respective biasing electrodes in network electrode circuit 150. By way of example and not limitation, in FIG. 2 single resistors are illustrated for each stage.

First network LC biasing electrodes 152 are coupled together in series, with one stage of network biasing resistor 154 electrically coupled between each set of sequentially coupled electrodes 152. For example, first stage biasing resistor $154_1$ is electrically coupled in series between center electrode 140 and first biasing electrode $152_1$, second stage biasing resistor $154_2$ is electrically coupled in series between first biasing electrode $152_1$ and second biasing electrode $152_2$, and so forth. First network electrode circuit 150 further comprises a bias voltage terminus 151 that is electrically coupled to bias voltage supply 142 (via LC cell bias voltage terminal 144) so that this terminus of first network electrode circuit 150 is maintained at the same voltage potential as center electrode 140. First network electrode circuit 150 further comprises a second terminus 159, which is at the electrically opposite end of the series circuit, and which is electrically coupled to a lens focus control voltage source 170 via a lens focus control terminal 172.

The respective resistance values of each stage of biasing resistors 154 are selected to provide the desired voltage drop across each stage (bias electrode and associated biasing resistor) to provide a quadratic voltage profile extending from center electrode 140 towards the last biasing electrode $154_n$ in the network electrode circuit. Such a nominal quadratic relationship corresponds to:

$$r_m = (2m-1)r_1,$$

wherein $r_m$ is the total resistance across stage m and r is the total resistance across the first stage. If desired, different design parameters can be used to account for optical system aberrations (such as lens materials that cause distortion or the like) such that the above formula may differ to account for such optical aberrations. Similarly, different nominal mathematical relations can be used if desired for a particular optical application (e.g., use of a cubed or squared relationship).

The example below for a nominal quadratic arrangement for a lens assumes a highly conductive biasing electrode without significant resistance itself and that the resistance of planar resistive layer 180 is large enough that it can be neglected (that is, assuming ideal conditions). As a design matter, however, the total resistance across each stage (including the biasing electrode, planar resistive layer, and any other components) is used to size the respective biasing resistor 154 for a given stage.

In the series coupling illustrated in FIG. 2, for example, first stage biasing resistor has a nominal resistance value of r ohms; second stage biasing resistor $154_2$ has a nominal resistance value of 3r ohms; third and subsequent stage biasing resistors have nominal values of 5r, 7r, 9r and so forth continuing on in the same series. These nominal resistance values, added to the resistance of the preceding biasing resistors (that is, resistors between the subject biasing resistor and center electrode 140) generate the desired quadratic voltage profile across biasing electrodes 152. Because the biasing electrodes in each network are electrically coupled together in series, the current i through each stage of the network is the same. Thus the voltage drop across the first stage is ir, across the second stage i(r+3r)=4ir; across the third stage i(4r+5r)=9ir, and so forth. In the typical arrangement, the distance between each respective biasing electrode is uniform so that the voltage on respective sequentially-coupled electrodes varies as the square of the distance from center electrode 140 (that is, the optical axis of LC cell 100).

Mathematically, the quadratic relation is established by summing all of the ir drops across each stage. The total voltage at the nth electrode is expressed by the relation:

$$v_n = ir_1 + ir_2 + ir_3 + \ldots ir_m + \ldots ir_n = i\Sigma_{m=1}^n r_m.$$

Substituting the formula for $r_m$ provides the following relation:

$$v_n = i\Sigma_{m=1}^n (2m-1)r.$$

Note that for n=1, 2, 3, 4 . . . , the value of $v_n$ is ir, 4ir, 9ir, 16ir . . . respectively. Thus $v_n$ varies quadratically as $v_n = n^2 ir$ Second network electrode circuit 160 comprises biasing electrodes $162_1$–$162_n$ and corresponding biasing resistors $164_1$–$164_n$. Second network electrode circuit first terminus 161 is electrically coupled to bias voltage source 142 (as illustrated in FIG. 2, such connection can be through center electrode 140; alternatively, a separate connection to bias voltage source 140 can be made. Second terminus 169 of second network electrode circuit 160 is similarly coupled to lens focus control voltage source 170 via terminal 172. Biasing resistors 164 have corresponding resistance values to biasing resistors 154 (e.g., biasing resistors $154_1$ and $164_1$ have the same resistance value, and so forth), thus the quadratic voltage gradient generated by second network electrode circuit 160 is the same as that of first network electrode circuit 150 and provides the symmetrical quadratic voltage gradient around center electrode 140.

LC cell 100 in accordance with the present invention typically further comprises a thin film resistive planar layer 180 disposed in electrical contact with center-biased symmetrical quadratic electrode network 130. Resistive planar layer 180 is typically disposed on first cover 110 with quadratic electrode network disposed thereover. The thin film resistive planar layer and quadratic electrode network are thus disposed on the same substrate. Resistive planar layer 180 comprises a high resistivity material (e.g., having a resistance that is at least one or more orders of magnitude greater than that of the respective stage biasing resistors 154). For example, planar resistive layer comprises amorphous silicon, such as n+ type silicon, having a resistance of about 16 MΩ per square; alternatively n– type amorphous silicon can be used. Because the resistance of the portion of planar layer 180 that is between two sequentially-coupled biasing electrodes 152 is greater than the resistance of the respective biasing resistor 154 through which the biasing electrodes are coupled in the respective network electrode circuit, substantially all current flow is through the biasing electrodes and associated stages of biasing resistors. The presence of resistive planar layer 180 between respective electrodes in symmetrical quadratic electrode network 130 results in a substantially linear voltage gradient across the respective gap between adjacent electrodes in active area 125 of LC cell 100. This arrangement provides a smoother approximation of the desired continuous quadratic index perturbation required for lens effect, thus improving lens efficiency by reducing the diffracted light that is lost when the biasing voltages are applied across LC cell 100 only in discrete steps (e.g., the biasing voltages are applied to approximate the quadratic voltage gradient only at the points along the respective biasing electrodes and the center electrode). In the embodiment in which ITO electrodes are used in lieu of highly conductive materials such as titanium, the physical size of the ITO electrodes is typically so large that the distance between two sequentially coupled ITO bias electrodes is small enough to obviate the need for planar layer 180.

By way of example and not limitation, an LC cell 100 that is adapted for use in an electro-optic lens is fabricated as follows: a thin film of substantially transparent (typically the material has optical transmission of 25% or greater, although device design can accomodate materials with lesser degrees of optical transmission) resistive material is formed at least over a portion of first cover 110 (FIG. 1) corresponding to LC cell active area 125 (FIG. 2) to form resistive planar layer 180. The n+ type amorphous silicon is deposited in a sputter, or alternatively, an evaporative, process to a thickness that is typically less than the thickness "T" (FIG. 1) (typically about 0.2 μm to 20 μm) of chamber 115 in which the liquid crystal material is disposed; in one example, a cell having a liquid crystal material thickness of about 9 μm, the amorphous silicon of resistive planar layer is about 0.13 μm.

Center-biased quadratic electrode network 130 is next formed on the surface of resistive planar layer 180, such as by depositing the conductive material (e.g., molybdenum) and etching the desired pattern so as to form center electrode 140 and the plurality of biasing electrodes in each network electrode circuit 150 and 160. From the design standpoint, it is desirable for optical characteristics that the biasing electrodes have a width (in the plane of resistive planar layer 180) that is as small as possible (typically limited by photolithographic fabrication techniques) consistent with having an electrode with acceptable electrical characteristics (such as resistance). In one example of an LC cell 100 fabricated in accordance with this invention, the width of the biasing electrodes is about 2.5 μm and the biasing electrodes are disposed on resistive planar layer 180 on about 12 μm centers, such that there is a gap of about 9.5 μm between respective sequential biasing electrodes. These biasing electrodes are readily used in an LC cell having an active area with a width of 1 mm or more, that is, the respective biasing electrodes have a length of about 1 mm. Biasing electrodes fabricated from Mo have a resistance in the range of about 0.25 Ω/sq to 0.4 Ω/sq, which is significantly less than the resistance of resistive planar layer 180. The same conductive material that is used to form biasing electrodes is typically further used to provide connecting lines to the respective stage biasing resistors.

Next, the respective stages of biasing resistors that couple respective biasing electrodes together in series to form the network electrode circuits are typically fabricated with ITO having a resistance of 450 Ω/sq. One arrangement of biasing resistors, with the biasing resistors disposed outside of active area 125, is illustrated in FIG. 2. As noted above, each stage of biasing resistor may comprise one resistor or multiple resistors electrically coupled together (either in series or parallel) (splitting resistors for a given stage can provide space-saving advantages on the substrate or cover plate on which the network is formed). Additionally, the resistors can be disposed all on one side of the quadratic electrode network or on alternating sides, as illustrated in FIG. 2. Alternative arrangements (not illustrated) include disposing the respective stages of biasing resistors on active area 125 (e.g., using a non-opaque material such as indium tin oxide), with the respective stages of resistors coupling adjacent biasing electrodes, thus making available more space on the substrate or cover plate for the active area of the device.

Following fabrication of the quadratic electrode network and resistive planar layer on first cover 110, and the deposition of ground electrode 120 on second cover 112, LC cell 100 is assembled to form chamber 115 with liquid crystal material 117 disposed between first cover 110 and second cover 112. Due to the thin film nature of the resistive planar layer and the quadratic electrode network the assembled cell is thin, typically having a thickness that is not greater than the center to center spacing of sequentially coupled bias electrodes (so that adequate optical resolution is provided by the lens). Commonly LC cell has a thickness in the range between about 0.2 μm and 20 μm, with a typical value of about 9 μm. Further, the thin film nature of the bias electrodes and resistor networks for generating the desired bias voltage gradient (e.g., these components are thin film in that they are disposed on a common substrate, such as one plate of the LC cell) provides a device that is rugged, compact, and readily fabricated.

Figure 3A:
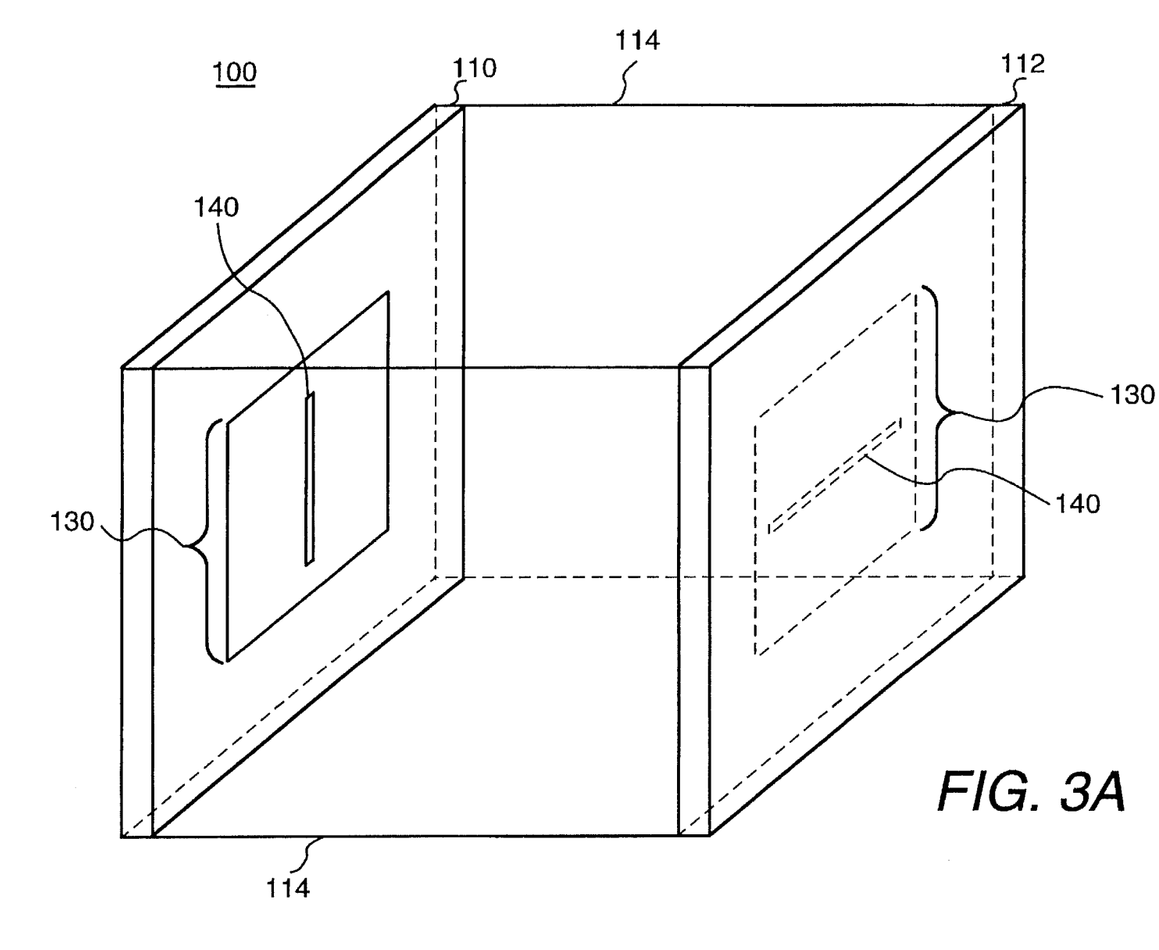
FIG. 3A is a perspective view of a liquid crystal cell in accordance with one embodiment of the present invention.
Figure 3B:
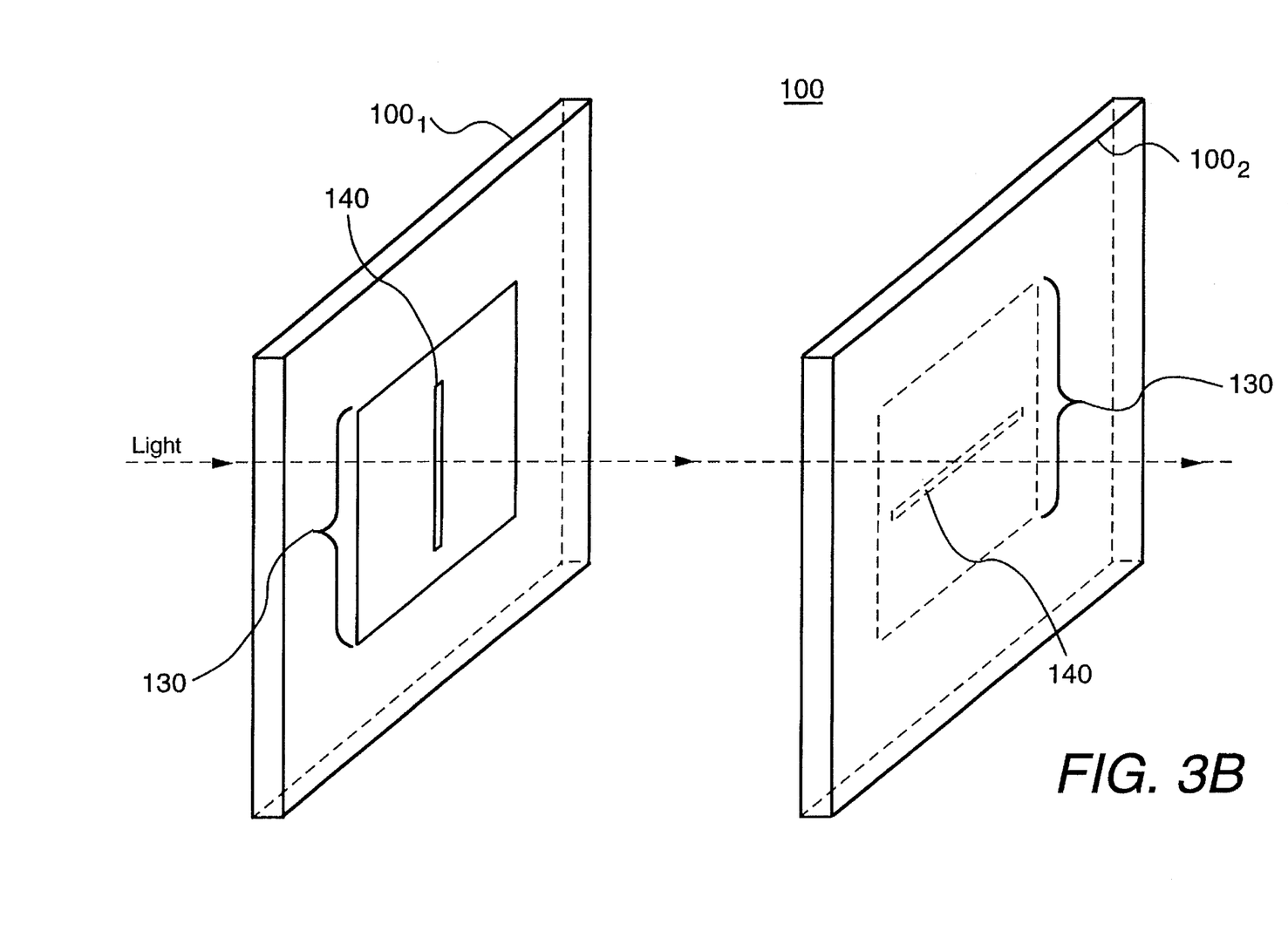
FIG. 3B is a perspective view of a liquid crystal lens comprising two liquid crystal cells in accordance with this invention.

A single LC cell 100 as described can be controlled to focus light passing through the cell onto a focal line, that is, the focal points generated across the lens form a line along the axis of the optical axis of the LC cell in the same plane as the optical axis of the cell. The position of the focal line from the cell (that is, the respective focal points) is dependent on the magnitude of the lens focus control voltage applied to LC cell 100. For a spherical electro-optic lens (that is, the lens will focus light to a single point), two such LC cells are typically optically coupled together in a cascade (that is, light passing from one LC cell is directed into the second LC cell) as illustrated in FIG. 3B, with a first LC cell $100_1$ and a second LC cell $100_2$, with the respective optical axis (which axis corresponds with the orientation of the center electrode 140 in each respective quadratic electrode network 130) of the respective LC cells disposed orthogonal to one another. Similarly, an elliptical electro-optic lens can be provided by applying different control voltages to the respective lens focus control terminals of the respective cells, such that the focal lines of the two lenses in the cascade are not disposed the same distance from the lens.

In operation, LC cell 100 in accordance with this invention need have only three terminals for coupling to components external to the cell: the ground connection for ground electrode 120 on second cover 112; the bias voltage connection for center electrode 140; and the lens focus control voltage connection for applying the drive voltage to the respective second terminus of each the first and second network electrode circuits. Maintenance of the biasing voltage on center electrode ensures that the range of the voltage gradient generated by the symmetrical quadratic electrode network is of a polarity and magnitude to be able to cause deflection of the molecules of liquid crystal material. Lens focus control voltage is typically a constant amplitude AC signal (e.g., a 1 KHz square wave); the magnitude of the voltage potential applied determines the quadratic voltage gradient generated across LC cell 100 and hence the distance of the focal point from the cell.

In a further alternative embodiment in accordance with this invention, a lens can be formed in a single LC cell 100. Such a cell (as illustrated in FIG. 3A) comprises one center-biased symmetric electrode network disposed on one cover of the cell and a second, independent, center-biased symmetric electrode network disposed on the opposing cover of the cell, with the respective optical axis of each symmetric electrode network (the optical axis corresponding to the orientation of center electrode 140 in each respective quadratic electrode network 130) being disposed orthogonal to the other (just as the respective optical axis of each cell in a cascade of cells is disposed orthogonal to the optical axis of the other cell in the cascade). In this embodiment, each respective center biased symmetric electrode network is the same as described above; in this embodiment, however, there is no ground electrode, but rather the threshold-potential biased center electrode on the opposing face of the cell serves as the reference potential for the liquid crystals. This cell similarly comprises three terminals: a bias voltage terminal coupled to the respective center electrodes of the electrode networks on the opposing faces of the cell, and a respective lens focus control voltage terminal for each of the center-biased electrode networks, one for each face of the cell.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A three-terminal liquid crystal (LC) lens cell comprising a center-biased quadratic electrode network, said quadratic electrode network comprising:

a center electrode electrically coupled to a bias voltage terminal so as to be maintained at a bias voltage, said center electrode being disposed at the optical axis of said LC cell;

a first network electrode circuit coupled to said center electrode, said first network electrode circuit comprising respective first through nth first series LC biasing electrodes electrically coupled together in series and a plurality of respective first network electrode circuit quadratic gradient network biasing resistors, each of said first network electrode circuit LC biasing electrodes being electrically coupled to an adjoining first network electrode circuit LC biasing electrode via a stage of said quadratic network biasing resistors; and a second network electrode circuit coupled to said center electrode, said second network electrode circuit comprising respective first through nth second series LC biasing electrodes electrically coupled together in series and a plurality of respective quadratic gradient network biasing resistors, each of the second network electrode circuit LC biasing electrodes being electrically coupled to an adjoining second network electrode circuit LC biasing electrode via a stage of said quadratic network biasing resistors;

each of said first and second network electrode circuits further comprising a respective control voltage terminus coupled to an LC cell lens focus control terminal, such that a control voltage applied via said lens focus control terminal generates a symmetric quadratic LC biasing voltage pattern extending between said center biasing electrode and the respective nth LC biasing electrodes in said first and second network electrode circuits.

2. The LC lens cell of claim 1 wherein said LC cell further comprises a first cover and a second cover disposed substantially parallel to one another and structurally coupled together to form a chamber therebetween, said LC cell further comprising LC molecules disposed within said chamber.

3. The LC lens of claim 2 wherein said LC cell is thin-film resistor biased, said thin-film resistor biased LC cell comprising an optically transparent electrically resistive planar layer disposed on said first cover, said center-biased quadratic electrode network being disposed in electrical contact with said resistive planar layer on said first cover, said resistive planar layer having a substantially uniform resistivity such that a substantially linear voltage gradient exists across gaps on said first cover between respective electrodes in said center-biased quadratic electrode network.

4. The LC lens cell of claim 3 wherein said resistive planar layer comprises amorphous silicon.

5. The LC lens cell of claim 2 further comprising a ground electrode disposed on said second cover.

6. The LC lens cell of claim 2 wherein said LC lens cell further comprises a second center-biased quadratic electrode network, said second center-biased quadratic electrode being disposed on said second cover such that the focal line of said second quadratic electrode network is disposed to the focal line of said quadratic electrode network disposed on said first cover.

7. The LC lens cell of claim 1 wherein said first network electrode circuit and second network electrode circuit biasing electrodes each comprise a material selected from the group consisting of molybdenum, titanium, chrome, and indium tin oxide.

8. The LC lens cell of claim 1 wherein each of said first and second network electrode circuit quadratic gradient network biasing resistors comprise first through nth stage resistors, said first stage resistor being electrically coupled between said center electrode and the first electrode of said respective network electrode circuit; said first stage resistor having value such that the resistance between the first and second stages of said network electrode circuit corresponds to a resistance of r, the second through nth resistors in said respective network electrode circuit having progressively increasing resistance values corresponding to the relationship:

$$r_m = (2m-1)r_1,$$

wherein $r_m$ is the total resistance across stage m, r is the total resistance across the first stage, and m is the stage in the network electrode circuit.

9. A liquid crystal (LC) lens comprising a first and a second liquid crystal (LC) cell optically coupled together, said first and second LC cells having respective first and second cell focal lines;

each of said LC cells comprising a center-biased symmetrical quadratic electrode network disposed on a cover plate of said LC cell, each quadratic electrode network comprising:

a center electrode electrically coupled to a bias voltage source via a bias terminal so as to be maintained at a bias voltage, said center electrode being disposed along said respective LC cell focal line, a first and a second network electrode circuit disposed on said cover plate, each of said network electrode circuits having a bias voltage terminus and a control voltage terminus; the respective bias voltage terminus of each of said first and second network electrode circuits being electrically coupled to said center electrode and the respective control voltage terminus of each of said first and second network electrode circuits being electrically coupled to a selectively variable lens focus control power supply; and an optically transmissive electrically resistive planar layer disposed in electrical contact with each electrode in said center-biased symmetrical quadratic electrode network, said resistive planar layer having a substantially uniform resistivity such that a substantially linear voltage gradient exists across gaps between respective electrodes in said center-biased symmetrical quadratic electrode network.

10. The LC lens of claim 9 wherein said first and second LC cells are optically coupled together in a cascade such that the respective cell focal line of said cells are disposed orthogonal to the other.

11. The LC lens of claim 10 wherein said first and second LC cells are coupled together to be adapted to comprise a lens type selected from the group consisting of spherical and elliptical lens types.

12. The LC lens of claim 9 wherein each of said first and second network electrode circuits comprises a respective plurality of biasing electrodes electrically coupled together in series and having respective quadratic gradient biasing resistors respectively electrically therebetween to provide a symmetric quadratic voltage pattern across each respective said LC cell, said symmetric quadratic voltage pattern corresponding to said voltage applied to said respective control voltage terminus.

13. The LC lens of claim 9 said first and second network electrode circuit each comprise respective first through nth first series LC biasing electrodes electrically coupled together in series and a plurality of respective first circuit quadratic gradient network biasing resistors, each of said first series LC biasing electrodes being electrically coupled to an adjoining first circuit LC biasing electrode via at least one of said quadratic network biasing resistor.

14. The LC lens of claim 9 wherein said optically transparent planar electrically resistive layer comprises amorphous silicon.

15. The LC lens of claim 9 wherein each of said LC cells comprises respective first and second covers, the respective LC cell center biased symmetrical quadratic electrode network and liquid crystal material being disposed therebetween.

16. The LC lens of claim 15 wherein the thickness of said LC cell is not greater than the center to center spacing of sequentially coupled bias electrodes.

17. The LC lens of claim 16 wherein the thickness of said LC cell is in the range between about 0.2 μm and 20 μm.

* * * * *